United States Patent
Silverstein et al.

(10) Patent No.: US 11,590,663 B2
(45) Date of Patent: Feb. 28, 2023

(54) VIRTUAL REALITY ENABLED ACTIVITY ALLOCATION

(71) Applicant: International Business Machines Corporation, Armonk, NY (US)

(72) Inventors: Zachary A. Silverstein, Jacksonville, FL (US); Melissa Restrepo Conde, Raleigh, NC (US); Shikhar Kwatra, Durham, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 16/742,019

(22) Filed: Jan. 14, 2020

(65) Prior Publication Data
US 2021/0213620 A1    Jul. 15, 2021

(51) Int. Cl.
*B25J 13/00* (2006.01)
*B25J 9/16* (2006.01)
(Continued)

(52) U.S. Cl.
CPC .......... *B25J 13/006* (2013.01); *B25J 9/1661* (2013.01); *B25J 9/1664* (2013.01); *B25J 9/1689* (2013.01);
(Continued)

(58) Field of Classification Search
CPC ...... B25J 13/006; B25J 9/1661; B25J 9/1664; B25J 9/1689; B25J 11/008; G06F 3/011; G06F 3/016; G06T 7/74; G06T 19/006
See application file for complete search history.

(56) References Cited

U.S. PATENT DOCUMENTS 9,880,553 B1    1/2018  Hoffmann et al.
11,199,853 B1 *  12/2021  Afrouzi ................ G05D 1/0246
(Continued)

FOREIGN PATENT DOCUMENTS

| CN | 1135480 | 1/2004 |
| CN | 105022281 A | 11/2015 |
| WO | 2019046559 A1 | 3/2019 |

OTHER PUBLICATIONS

Jackson, Astrid et al., "The Benefits of Teaching Robots using VR Demonstrations", HRI '18 Companion, Mar. 5-8, 2018, pp. 129-130.
(Continued)

*Primary Examiner* — Chong Wu
(74) *Attorney, Agent, or Firm* — Dan Yeates; Hunter E. Webb; Keohane & D'Alessandro, PLLC

(57) ABSTRACT

Disclosed embodiments provide techniques for virtual reality enabled activity allocation. A camera system monitors a physical environment from multiple angles, generating real-time video feeds of the physical environment. A real-time virtual reality environment (RTVRE) rendering system utilizes the real-time video feeds as input to create a virtual reality environment that is representative of the physical environment. A user performs an action in the virtual environment that corresponds to a task to be performed in the physical environment. A computer-implemented virtual reality control management system assesses the task and assigns the task to an electromechanical device that is best-suited to perform the task, based on a scoring algorithm. This enables actions such as remote monitoring and control of a premises. Thus, disclosed embodiments improve the technical field of remote monitoring and control of a premises.

20 Claims, 15 Drawing Sheets

(51) Int. Cl.
G06T 19/00 (2011.01)
G06F 3/01 (2006.01)
G06T 7/73 (2017.01)

(52) U.S. Cl.
CPC .............. *G06F 3/011* (2013.01); *G06F 3/016* (2013.01); *G06T 7/74* (2017.01); *G06T 19/006* (2013.01)

(56) References Cited

U.S. PATENT DOCUMENTS

| | | |
|---|---|---|
| 2015/0314440 A1 | 11/2015 | Parker |
| 2016/0257000 A1 | 9/2016 | Guerin et al. |
| 2019/0202053 A1 | 7/2019 | Tan et al. |
| 2019/0228495 A1 | 7/2019 | Tremblay et al. |
| 2019/0337451 A1* | 11/2019 | Bacchus ............... B60Q 9/008 |
| 2021/0053229 A1* | 2/2021 | Yuan ..................... B25J 9/0084 |

OTHER PUBLICATIONS

Zhang, Tianhao et al., "Deep Imitation Learning for Complex Manipulation Tasks from Virtual Reality Teleoperation", https://arxiv.org/abs/1710.04615, Mar. 6, 2018, 9 pgs.

R. Dillmann, "Teaching and learning of robot tasks via observation of human performance." Robotics and Autonomous Systems, 47 (2004) 109-116.

N. Koganti et al., "Virtual Reality as a User-friendly Interface for Learning from Demonstrations." In Extended Abstracts of the 2018 CHI Conference on Human Factors in Computing Systems (CHI EA '18). ACM, Paper D310, 4 pages, 2018.

Melnick, Kyle, "Navigate Your Smart Home Devices in AR", https://vrscout.com/news/smart-home-devices-in-ar/, Jul. 1, 2018, 10 pgs.

Mayo Clinic, "Robotic Surgery", https://www.mayoclinic.org/tests-procedures/robotic-surgery/about/pac-20394974, Jan. 30, 2019, 3 pgs.

Hammacher Schlemmer, "The Room Tidying Pickup Robot", https://www.hammacher.com/product/room-tidying-pickup-robot, 1999, 3 pgs.

Wikipedia, "da Vinci Surgical System", https://en.wikipedia.org/w/index.php?title=Da_Vinci_Surgical_System&oldid=928692187, Dec. 1, 2019, 4 pgs.

Vaccari, Alberto, "How Virtual Reality Meets the Industrial Iot", https://pdfs.semanticscholar.org/4af5/6a2a82f9683bb30b30711d613e2ca5dd7494.pdf, 2015, 3 pgs.

Adi Gaskell, "Using VR to Control Robots", https://dzone.com/articles/using-vr-to-control-robots, Nov. 13, 2017, 3 pages.

* cited by examiner

1200

| 1210 | |
|---|---|
| 1212 — DEVICE ID: | H76B4 |
| 1214 — DEVICE DESCRIPTION: | General Purpose Robot |
| 1216 — DEDICATED DEVICE: | N |
| 1218 — MANIPULATION BITMAP: | 0x001F |
| 1220 — OBJECT WEIGHT LIMIT: | 13 Kg |
| 1222 — ELEVATION BITMAP: | 0x0007 |
| 1224 — REGION: | 3,4 |
| 1226 — REGION DESCRIPTION | Lower Level, Garage |

| 1240 | |
|---|---|
| 1242 — DEVICE ID: | R5NB7 |
| 1244 — DEVICE DESCRIPTION: | Garage Door Opener |
| 1246 — DEDICATED DEVICE: | Y |
| 1248 — DEDICATED OBJECT ID: | GD002 |
| 1250 — DEDICATED OBJECT DESC: | Left Garage Door |
| 1252 — CAPABILITY BITMAP: | 0x0003 |

FIG. 12

VIRTUAL REALITY ENABLED ACTIVITY ALLOCATION

FIELD

The present invention relates generally to virtual reality, and more particularly, to virtual reality enabled activity allocation.

BACKGROUND

Virtual reality (VR) refers to a computer-generated process that immerses the user into a virtual environment. Using a device such as a VR headset, virtual reality provides a user with the sensation of a simulated world or environment.

Virtual reality is performed by stimulating various human senses. A major aspect of virtual reality is stimulating the visual senses. VR headsets are designed to create an immersive 3D environment. VR headsets include the optics and electronics for rendering a display in front of eyes that displays a view of the virtual environment. Two autofocus lenses are generally placed between the screen and the eyes that adjust based on individual eye movement and positioning. The visual elements provided to the user on the screen are rendered by an electronic computing device such as a mobile phone or other connected computing device.

Another aspect of virtual reality is sound. Sound that is synchronized with the visual component can create very engaging effects. Headphone speakers, combined with audio processing to create directional sound effects, can help to provide an immersive experience.

Another aspect of virtual reality is head tracking. VR headsets may include devices such as accelerometers to detect three-dimensional movement, gyroscopes for angular movement and/or a magnetic compass to identify the orientation of a user. As the user moves his/her head, the display and/or sounds presented to the user are updated in real time, making the user feel as if he/she is "looking around" in the virtual environment.

Virtual reality is finding new uses in areas such as gaming, entertainment, and education. As technology improves, new and exciting applications for virtual reality are enabled.

SUMMARY

Embodiments provide a computer-implemented method for executing a task in a physical environment based on a virtual action, the method comprising: generating a real-time virtual reality (RTVR) environment based on one or more live camera feeds from the physical environment; detecting an occurrence of the virtual action in the RTVR environment; determining a task in the physical environment that corresponds to the virtual action in the RTVR environment; deriving a score for each electromechanical device from a plurality of electromechanical devices disposed within the physical environment based on capability to perform the task; ranking the plurality of electromechanical devices based on the derived score; and in response to determining a high score at or above a threshold, assigning the task to the electromechanical device associated with the high score.

Additional embodiments provide an electronic computation device comprising: a processor; a memory coupled to the processor, the memory containing instructions, that when executed by the processor, cause the electronic computation device to: generate a real-time virtual reality (RTVR) environment based on one or more live camera feeds from a physical environment; detect a virtual action occurring in the RTVR environment; determine a task in the physical environment that corresponds to the virtual action in the RTVR environment; derive a score for each electromechanical device from a plurality of electromechanical devices disposed within the physical environment based on capability to perform the task; rank the plurality of electromechanical devices based on the derived score; and in response to determining a high score at or above a threshold, assign the task to the electromechanical device associated with the high score.

Additional embodiments provide a computer program product for an electronic computation device comprising a computer readable storage medium having program instructions embodied therewith, the program instructions executable by a processor to cause the electronic computation device to: generate a real-time virtual reality (RTVR) environment based on one or more live camera feeds from a physical environment; detect a virtual action occurring in the RTVR environment; determine a task in the physical environment that corresponds to the virtual action in the RTVR environment; derive a score for each electromechanical device from a plurality of electromechanical devices disposed within the physical environment based on capability to perform the task; rank the plurality of electromechanical devices based on the derived score; and in response to determining a high score at or above a threshold, assign the task to the electromechanical device associated with the high score.

BRIEF DESCRIPTION OF THE DRAWINGS

Features of the disclosed embodiments will be more readily understood from the following detailed description of the various aspects of the invention taken in conjunction with the accompanying drawings.

FIG. 12 shows exemplary data structures in accordance with embodiments of the present invention.

Figure 1:
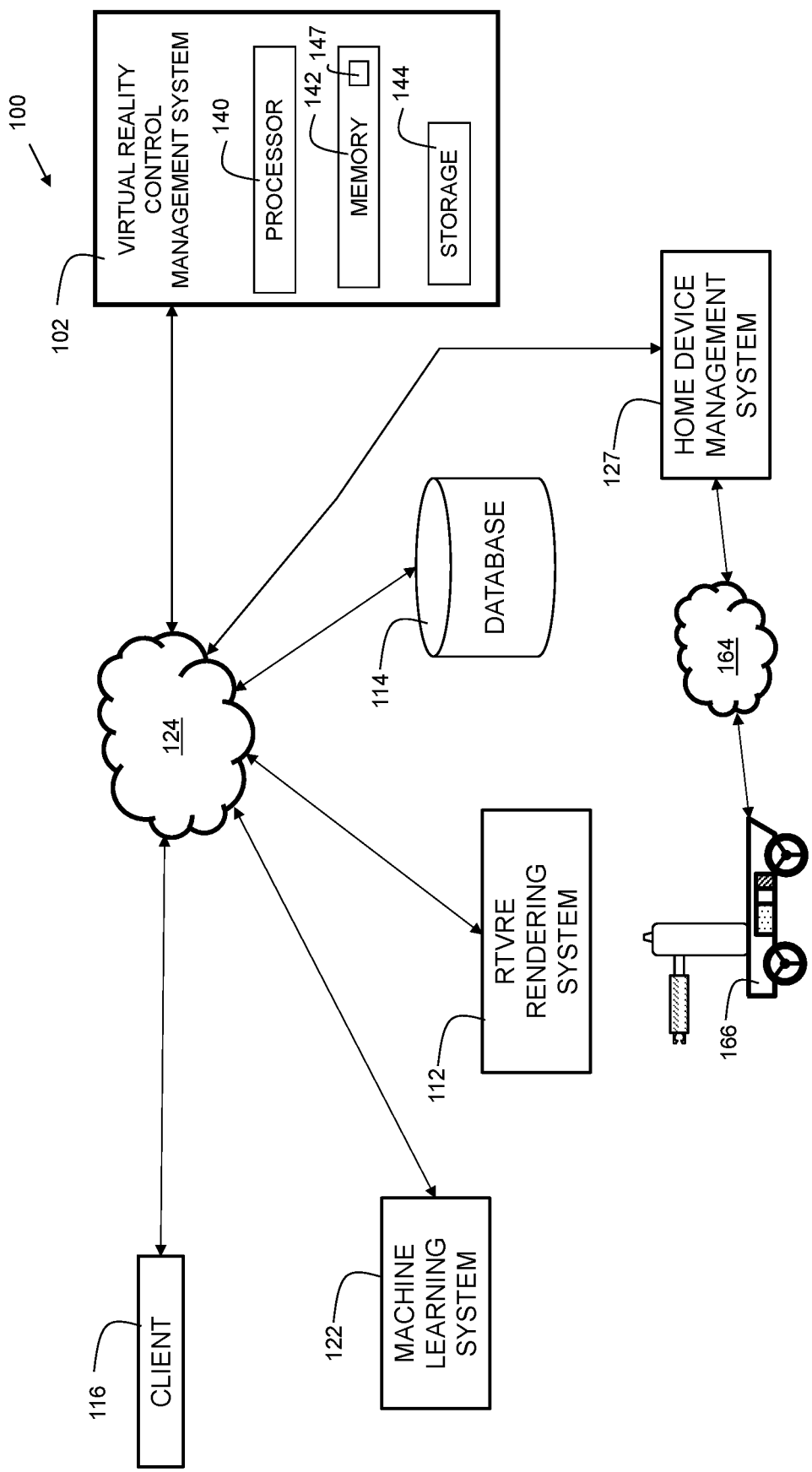
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for virtual reality enabled activity allocation. A camera system monitors a physical environment from multiple angles, generating real-time video feeds of the physical environment. A real-time virtual reality environment (RTVRE) rendering system utilizes the real-time video feeds as input to create a virtual reality environment that is representative of the physical environment. A user performs an action in the virtual environment that corresponds to a task to be performed in the physical environment. A computer-implemented virtual reality control management system assesses the task and assigns the task to an electromechanical device that is best-suited to perform the task, based on a scoring algorithm. This enables actions such as remote monitoring and control of a premises. Thus, disclosed embodiments improve the technical field of remote monitoring and control of a premises.

As an example usage of disclosed embodiments, a user is at work at her office and wishes to check the status of the physical environment in her home. She dons virtual reality headgear and enters a virtual environment created by the RTVRE system that is representative of the physical environment of her home. As she navigates the virtual environment, she notices that the garage door was left open and that her pet cat moved some cat litter onto the floor. She goes to the garage door in the virtual environment and makes a pull-down motion, then goes to the area where the cat litter is, and makes a sweeping motion. The virtual reality control management system associates the pull-down motion with the task of closing the garage door, and the sweeping motion with the task of cleaning up of debris on the floor. The virtual reality control management system then assigns the task of closing the garage door to the garage door opening system, and instructs it to close the garage door via network, IoT (Internet of Things), and/or other technology. The virtual reality control management system then assigns the task of cleaning the debris to a robot vacuum cleaner and instructs it to clean the area indicated by the sweeping motion, via network, IoT, and/or other technology. Additional examples are outlined in the detailed description that follows.

Reference throughout this specification to "one embodiment," "an embodiment," "some embodiments", or similar language means that a particular feature, structure, or characteristic described in connection with the embodiment is included in at least one embodiment. Thus, appearances of the phrases "in one embodiment," "in an embodiment," "in some embodiments", and similar language throughout this specification may, but do not necessarily, all refer to the same embodiment.

Moreover, the described features, structures, or characteristics of the disclosed embodiments may be combined in any suitable manner in one or more embodiments. It will be apparent to those skilled in the art that various modifications and variations can be made to the disclosed embodiments without departing from the spirit and scope and purpose of disclosed embodiments. Thus, it is intended that the disclosed embodiments cover the modifications and variations of disclosed embodiments provided they come within the scope of the appended claims and their equivalents.

FIG. 1 is an environment 100 for disclosed embodiments. A virtual reality control management system (VRCMS) 102 may include a processor 140, memory 142, and storage 144. The processor 140 is coupled to the memory 142 such that it can access instructions 147 stored in memory 142. The processor 140 executes the instructions 147, stored in memory 142, in implementation of disclosed embodiments. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, or other suitable storage technology. The VRCMS 102 is connected to network 124. Network 124 is the Internet, a wide area network, a local area network, or any other suitable network. System 102 is an electronic computation device. Note that while one such device is shown in environment 100, in practice, there may be multiple electronic computing devices operating in a distributed manner for load balancing and data redundancy.

Client device 116 is an electronic computing device that provides virtual reality capability. It may include a virtual reality headset, mobile computing device (e.g., a smartphone, tablet computer, or other suitable computing device), laptop computer, desktop computer, and/or wearable computing device. In embodiments, a user uses client device 116 to navigate a virtual environment (world) to perform a virtual action that is associated with a task. The task is then carried out in a corresponding physical environment (world) by an electromechanical device.

Machine learning system 122 may be used to further categorize and classify input data including image data, scenery, object recognition and/or object classification, person recognition, virtual action classification, and/or other classification processes. Machine learning system 122 may include one or more neural networks, convolutional neural networks (CNNs), and/or other deep learning techniques. The machine learning system 122 may include regression algorithms, classification algorithms, clustering techniques, anomaly detection techniques, Bayesian filtering, and/or other suitable techniques to analyze the information obtained by the RTVRE rendering system 112 to assist in categorizing the information.

Real-time virtual environment (RTVRE) rendering system 112 comprises one or more computing devices that renders a virtual environment corresponding to a physical environment. RTVRE rendering system 112 may utilize input data that includes multiple live video feeds of a premises. For example, the input data can include feeds from multiple digital video cameras disposed throughout a home of a user, capturing multiple views of the premises, including multiple views of the same scene from different viewing angles. In embodiments, RTVRE rendering system 112 may interface with a machine learning system 122 to perform image analysis to identify and/or classify objects within the video feeds. These objects may then be indicated in the virtual environment with additional highlighting and/or annotation.

Environment 100 further includes a home device management system 127. Home device management system 127 comprises one or more computing devices that manage electromechanical devices within a premises. The premises may be a residential home, office building, warehouse, factory, or other premises type. The home device management system 127 may utilize wired and/or wireless communication technologies to communicate with electromechanical devices within the premises. The communication technologies can include, but are not limited to, wired Ethernet, Wi-Fi, Bluetooth, Zigbee, Thread, Infrared, and/or other suitable technology. In some embodiments, a dedicated network 164 may be used to communicate between the home device management system 127 and an electromechanical device 166. The dedicated network 164 may be a wireless network of limited range, such that the wireless network is not accessible outside of the premises. In some embodiments, network 164 may be an ad hoc network.

The electromechanical device 166 may be a general-purpose robot with various capabilities such as gripping, lifting, pushing, and/or pulling of an object. Electromechanical devices used in disclosed embodiments may also include dedicated devices. The dedicated devices are special-purpose devices that can include special purpose robots, such as robotic vacuum cleaners, robotic mops, and/or other robotic devices dedicated to the purpose of cleaning floors. Other special purpose robots that may be utilized in disclosed embodiments include pool-cleaning robots, window-cleaning robots, and/or grass-cutting robots.

The electromechanical devices used in disclosed embodiments may also include special purpose appliance control devices, such as thermostats, garage door openers, window shade controllers, window openers, entry door openers, electronically controllable locks, electronically controllable lighting, plumbing control devices (e.g., in-ground sprinkler systems), and/or other special-purpose electromechanical devices.

Some embodiments of the present invention may operate without dedicated network 164. In such embodiments, electromechanical devices may communicate with other elements of the system via network 124.

Database 114 may be used to store data about the premises in which disclosed embodiments are used. The data can include floorplan data, data regarding the electromechanical devices available in the premises, operating rules and policies, and/or custom preferences established by the user. Database 114 may be a relational database such as a Structured Query Language (SQL) database.

In embodiments, the virtual reality control management system 102 communicates with the client 116, RTVRE rendering system 122, home device management system 127, and/or database 114 to execute a task in a physical environment based on a virtual action performed in a virtual environment. As an example, the RTVRE rendering system 112 renders a virtual environment based on video feeds captured from a physical environment (e.g., a room of a residential home). A user performs a virtual action in the virtual environment by using client 116 (e.g., a virtual reality headset, mobile computing device, laptop computer, desktop computer, etc.). Continuing the example, the user utilizes client 116 to perform a virtual action in a virtual environment of pulling a window shade down. The virtual reality control management system 102 associates the action with the task of lowering a window shade. The virtual control management system 102 retrieves premises and electromechanical device information from database 114. The information in the database indicates that there is a dedicated IoT-enabled electrically-controlled window shade in the premises. The virtual reality control management system 102 sends a message to the home device management system 127 to issue a command to the IoT-enabled electrically-controlled window shade to move to its lowered position, thus executing a task in the physical environment based on a virtual action performed in a corresponding virtual environment.

Alternatively, in the case of a conventional, manually-operated window shade, the virtual reality control management system 102 sends a message to the home device management system 127 to dispatch general-purpose robot device 166 to grip the window shade and pull it down. In this way, disclosed embodiments make use of both special-purpose and general-purpose electromechanical devices and robots to execute tasks in the physical environment based on a virtual action performed in a corresponding virtual environment. In some embodiments, a user may opt in as part of a user agreement to allow the virtual reality control management system 102 to access networks and/or electronic devices and/or electromechanical devices within the premises. The aforementioned scenarios are exemplary, and other use cases are possible with disclosed embodiments.

Figure 2:
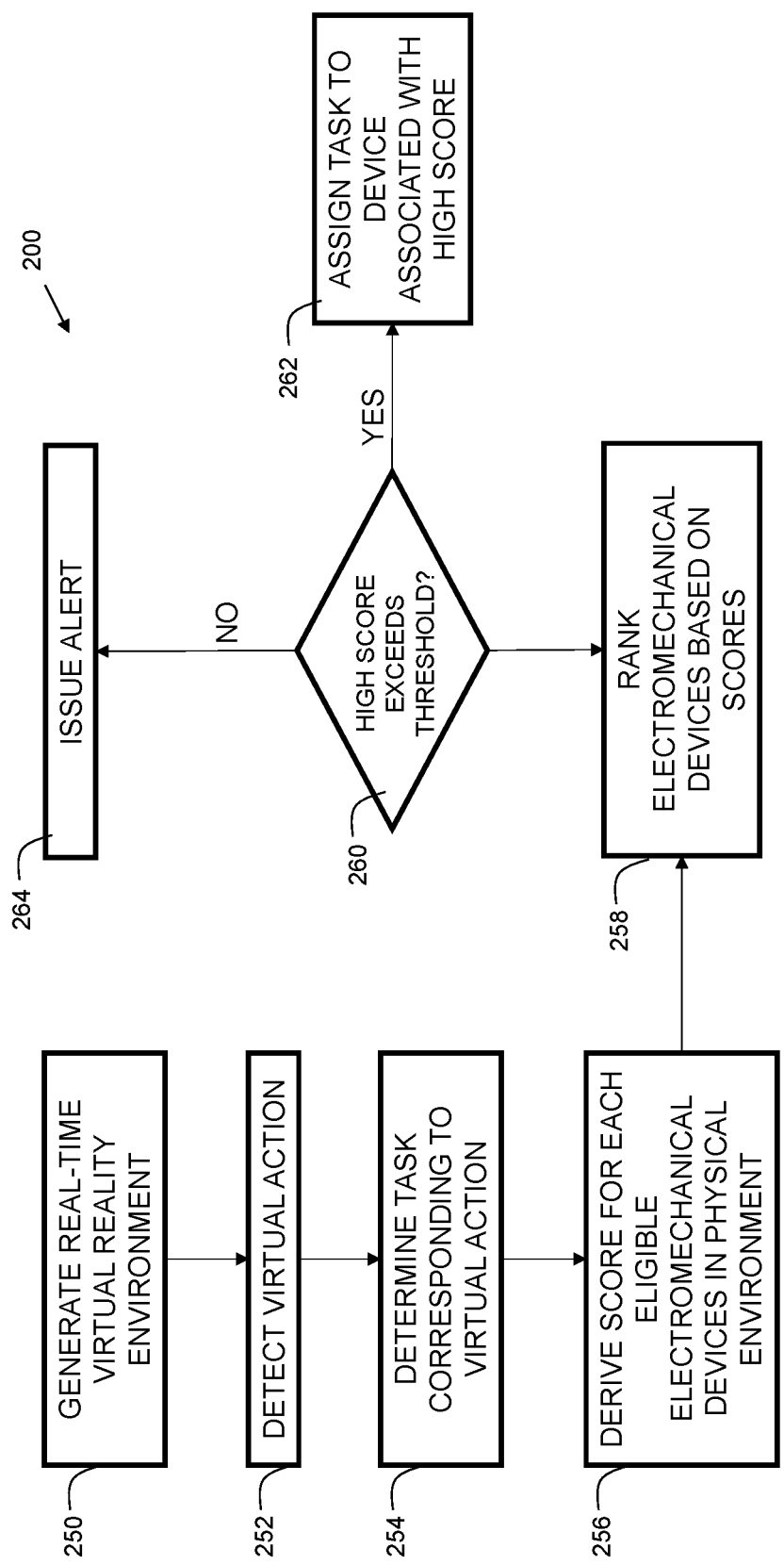
FIG. 2 is a flowchart for embodiments of the present invention.

FIG. 2 is a flowchart 200 for disclosed embodiments. At 250, a real-time virtual-reality environment is generated, based on video data captured from a physical environment (premises). In some embodiments, additional data, such as data from light field cameras, volumetric 3D capture equipment, photogrammetry techniques, and/or other suitable techniques, may also be used to supplement and/or generate the real-time virtual-reality environment. Thus, the real-time virtual-reality environment corresponds to the current conditions of a physical environment. These conditions can include, but are not limited to, the location and orientation of objects within the premises, ambient light at the premises, sounds occurring at the premises, and/or other data.

At 252, a virtual action is detected. The virtual action can include movement and/or positioning of a virtual body part (e.g., a virtual hand, arm, leg, etc.). The virtual action can include selection and/or manipulation of a virtual object in the premises (e.g., a chair, a bottle on a table, etc.).

At 254, a task corresponding to the virtual action is determined. In embodiments, this may be determined based on a lookup table, database, or other list of predetermined actions. In other embodiments, the task corresponding to the virtual action may be determined through operator training and/or other machine learning techniques such as supervised learning. In some embodiments, a user may train virtual reality control management system 102 based on output of machine learning system 122. In some embodiments, the user may train virtual reality control management system 102 by performing virtual actions in the virtual environment while uttering a phrase that depicts the desired action. The uttered phrase may be detected by a microphone connected to the client 116, converted to text and associated with a task. As an example, a user may perform a virtual action of a pulling downward motion, and utter the phrase "lower window shade." An association between the virtual action and the task can be stored in database 114.

In some embodiments, the user may train virtual reality control management system 102 by performing physical actions in the physical environment while uttering a phrase that depicts the desired action. The uttered phrase may be detected by a microphone connected to the home device management system 127 and/or client 116, converted to text and associated with a task. As an example, a user may perform a physical action of a sweeping motion, and utter the phrase "clean floor debris." An association between a virtual action of sweeping that corresponds to the physical action performed during the training, and the task can be stored in database 114. Then, when a user performs a virtual action of sweeping, it is associated with the task of cleaning floor debris, and the virtual reality control management system 102 dispatches an appropriate electromechanical device (e.g. a floor-cleaning robot) to clean the debris.

In some embodiments, the virtual action can be a symbolic action. As an example, a user in a virtual environment may notice debris on the floor in the virtual environment. The user may perform an action of moving a virtual hand in a circle motion around the debris. The virtual reality control management system 102 may be configured to interpret the circle motion as a symbolic action for cleaning debris, and in response, dispatch a robotic vacuum cleaner to the location of the debris in the physical environment to perform the task of cleaning, which is associated with the symbolic action of moving a virtual hand in a circular motion. Thus, embodiments can include detecting a symbolic action in the RTVR environment, and wherein the assigned task is associated with the symbolic action.

Embodiments can include generating a real-time virtual reality (RTVR) environment based on one or more live camera feeds from a physical environment, detecting a virtual action occurring in the RTVR environment, determining a task in the physical environment that corresponds to the virtual action in the RTVR environment, deriving a score for each electromechanical device from a plurality of electromechanical devices disposed within the physical environment based on capability to perform the task, ranking the plurality of electromechanical devices based on the derived score, and in response to determining a high score at or above a threshold, assigning the task to the electromechanical device associated with the high score.

At 256, a score for each eligible electromechanical device in the physical environment is derived. The score may be based on task requirements as well as device capabilities. Metadata for each electromechanical device may be stored within database 114 or other suitable storage medium. The metadata may include manipulation capabilities, such as grasp, push, pull, raise, lower, and the like. In embodiments, the capabilities may be represented in the database 114 as a bitmap. Other capabilities can include a weight limit for the objects that can be manipulated, and a size limit for the objects that can be manipulated. Other capabilities can include elevation capabilities. Elevation capabilities are indicative of how high or low a robot can reach to perform an action. As an example, a special-purpose robot such as a floor cleaning robot may be limited to only operating on objects that are on the floor, while a general-purpose robot with an articulating arm may be able to reach to the ceiling, and thus have increased elevation range/capabilities compared with the special-purpose robot designed for floor cleaning. Other capabilities can include operating regions. As an example, a general-purpose robot utilizing wheels for mobility may be confined to operate in a particular level of a premises (e.g., lower level), whereas a general-purpose robot utilizing legs for mobility may have the capability to traverse stairs, and thus be able to operate on both a lower level and an upper level of a premises. The aforementioned metadata and capabilities are not meant to be limiting, and other capabilities and/or metadata may be utilized in some embodiments.

In embodiments, a mathematical formula may be used to derive a score for each device. In some embodiments, the mathematical formula for the device score S may be of the form:

$$S(d,t,j)=E(d,j)R(d,j)W(d,j)+P(d,t)$$

Where $S(d,j,t)$ is the score for device d to perform task t with object j;

$E(d,j)$ is an elevation function for device d to access object j;

$W(d,j)$ is a weight capability function for device d to lift/move object j;

$P(d,t)$ is a function returning a positive value of the device d if a special purpose device is performing task t;

Function $E(d,j)$ returns a positive value if the device d can reach/access the object j, and returns zero if the device cannot reach/access the object. Function $W(d,j)$ returns a positive value if the device d can lift/move the object, and returns zero if the device cannot lift/move the object.

Thus, if an electromechanical device cannot reach an object, or an object is too heavy for the electromechanical device to move, the score S is low. The additive component of function $P(d,t)$ allows a special-purpose electromechanical device to be scored higher than a general-purpose electromechanical device such as a robot. As an example, if the task t to be performed is lowering a window shade, and a general-purpose robot can reach the window shade and pull it down, and the window shade is also controllable by a IoT-enabled window shade which is deemed as a dedicated device for lowering the window shade, then the dedicated device is scored higher, thus favoring use of dedicated devices where possible to perform tasks corresponding to detected virtual actions.

At 258, electromechanical devices are ranked based on the scores from 256. In embodiments, a higher score indicates a device that is better suited for the task. At 260, a check is made to determine if the high score device (the device having the highest score S) exceeds a predetermined minimum score threshold. If yes, then at 262, the task is assigned to the electromechanical device associated with the high score. If no, then at 264, an alert is issued, providing an indication to the user that the task cannot be assigned. Thus, in embodiments, in response to determining a high score below a threshold, an alert is provided to a user operating in the RTVR environment.

Figure 3:
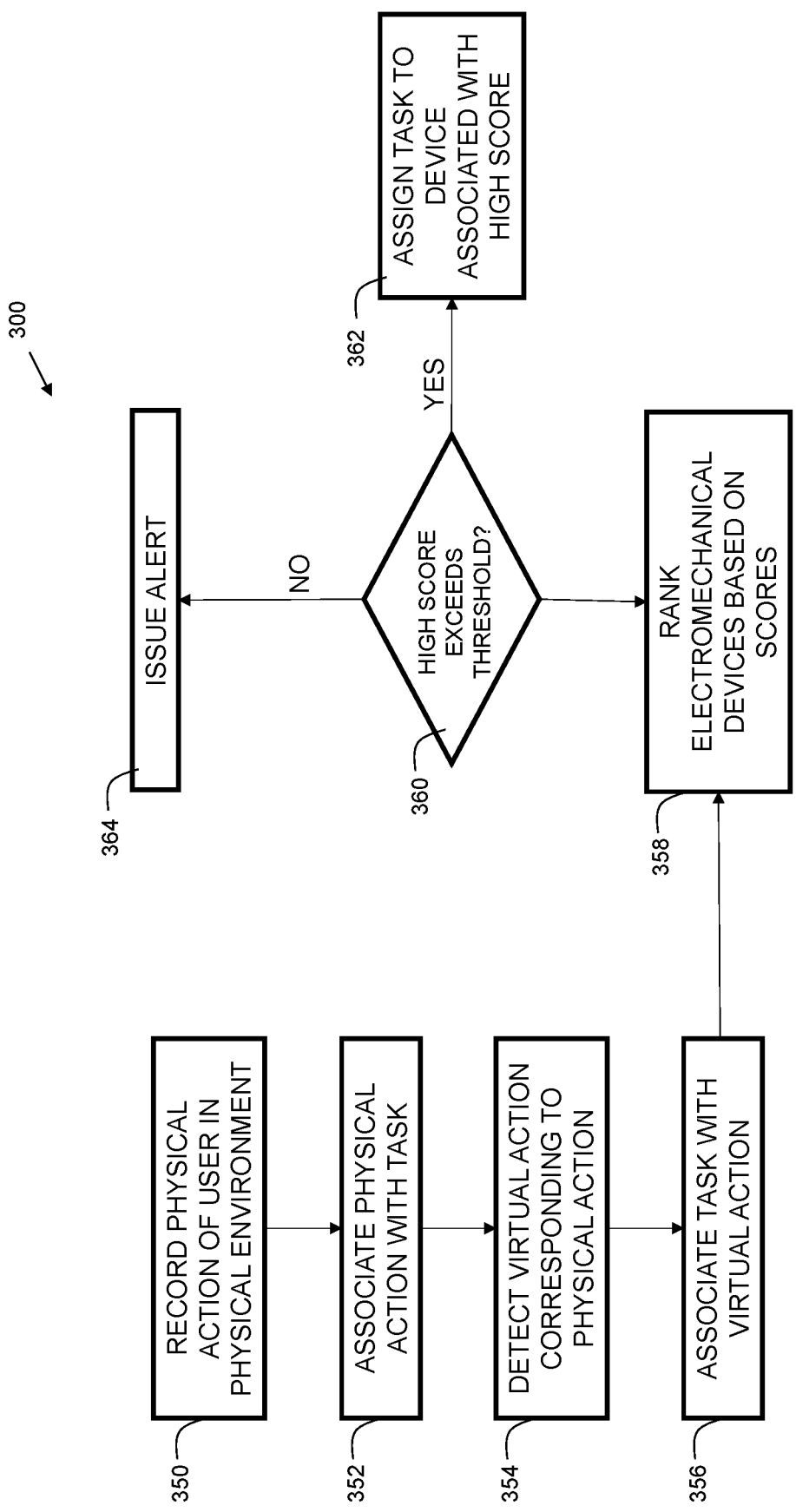
FIG. 3 is a flowchart for additional embodiments of the present invention for associating physical actions, virtual actions, and tasks.

FIG. 3 is a flowchart 300 for additional embodiments of the present invention for associating physical actions, virtual actions, and tasks. At 350, a physical action of a user in the physical environment is recorded. The physical action can include motion of the user. As an example, the task of lowering a window shade can be performed by the physical action of gripping a window shade and pulling it down. At 352, the physical action is associated with a task. Continuing with the window shade example, in embodiments, a user may train the virtual reality control management system 102 by uttering a phrase during (or shortly before or after) performing the physical action. The uttered phrase may include a task description (e.g., "lowering window shade"). In some embodiments, utilizing object recognition based on classifiers from machine learning system 122, the physical action of gripping the window shade and pulling it down is associated with lowering the window shade. Then, at 354, when a user in the virtual environment performs a similar action of gripping and pulling a window shade down, the task associated with the similar physical action is associated with the virtual action at 356.

At 358, electromechanical devices are ranked based on the scores from 356. In embodiments, a higher score indicates a device that is better suited for the task. At 360, a check is made to determine if the high score device (the device having the highest score S) exceeds a predetermined minimum score threshold. If yes, then at 362, the task is assigned to the electromechanical device associated with the high score. If no, then at 364, an alert is issued, providing an indication to the user that the task cannot be assigned.

Embodiments can include recording a physical action of a user in the physical environment, associating the physical action with the task, and wherein detecting the virtual action occurring in the RTVR environment comprises detecting the virtual action corresponding to the physical action, and wherein assigning the task comprises assigning the task associated with the physical action.

Figure 4:
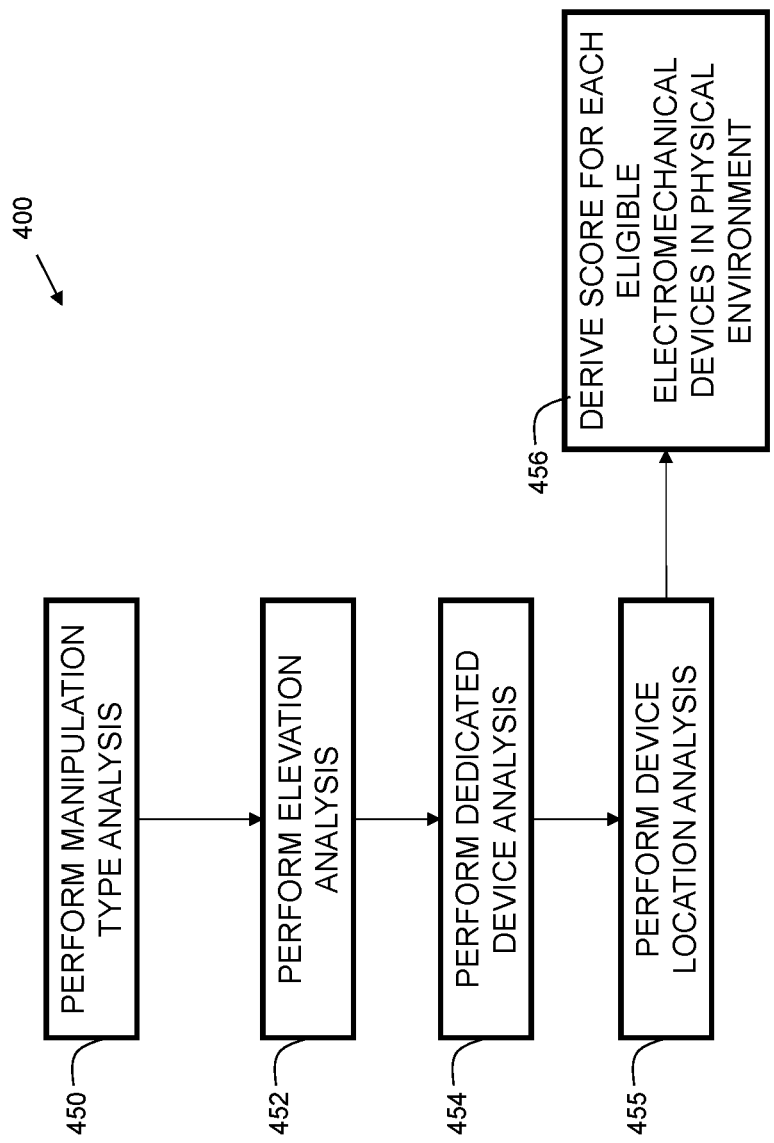
FIG. 4 is a flowchart for additional embodiments of the present invention for device scoring.

FIG. 4 is a flowchart 400 for additional embodiments of the present invention for device scoring. At 450, a manipulation type analysis is performed by searching the database 114 and determining the manipulation type capabilities of each electromechanical device at the premises. The manipulation type analysis can include determining which type of manipulation(s) are being performed on an object in the virtual environment. Manipulation types can include, but are not limited to, grasping, pushing, pulling, turning, lifting, tipping, rotating, and/or other manipulation types.

At 452, an elevation analysis is performed by searching the database 114 and determining the operating elevation range of each electromechanical device at the premises. The elevation analysis can include determining a range of elevation that includes an object in the virtual environment. The elevation analysis can include determining a range of elevation from a floor level. As an example, a task associated with pushing an object located on a floor may be at a range of elevation from 0 meters to 0.5 meters above the floor. A task associated with moving an object from one location on a high shelf to another location on the same shelf, may have a range of elevation from 2.0 meters to 2.5 meters above the floor. A task associated with retrieving an object from a high shelf and placing the object on the floor may have a range of elevation from 0.0 meters to 2.5 meters, since it requires an electromechanical device that can both reach 2.5 meters, and also set an object down at 0.0 meters (floor level).

At 454, a dedicated device analysis is performed. A dedicated device is a special-purpose device specifically designed for a task or set of tasks. As an example, a garage door opener is a special-purpose appliance for raising or lowering a garage door. In contrast, a general-purpose robot may be capable of opening and/or closing a garage door by gripping the door and pulling it accordingly. In embodiments, if both a dedicated device and a non-dedicated device are capable of performing a task, the dedicated device is favored for selection to perform that task.

At 455, a device location analysis is performed. The device location analysis may be performed using position-reporting messages from the device. The device location analysis may be performed based on data retrieved from a geolocation system (e.g., Global Positioning System, GLO-NASS, Galileo, and the like). Similarly, a device location analysis may be performed based on data retrieved from an indoor positioning system, such as one that utilizes triangulation of radio signals to determine a location within a premises. In embodiments, the location of the device relative to the location of the task may be used as criteria in device scoring. As an example, for the task of lowering a window shade in a kitchen, a robot that is currently located in the kitchen may be scored higher than a similar robot that is located in a room further away and on a different level of the premises than the kitchen.

At 456, a score for each eligible electromechanical device is computed. Some electromechanical devices may not be eligible for a given task. For example, devices classified as dedicated devices are only eligible for their designated task. Thus, a garage door opener can only be used for the tasks of opening and closing a garage door, but is not used for moving an object on the kitchen counter. In contrast, a general-purpose device such as a robot, may be used for a wide variety of tasks. In the case of a general-purpose device, various criteria such as the manipulation type, elevation analysis, weight and size of the object to be manipulated in performing the task, and/or other factors, may be considered in deriving the device score.

In some embodiments, deriving a score for each electromechanical device from a plurality of electromechanical devices disposed within the physical environment comprises performing a manipulation type analysis. In some embodiments, deriving a score for each electromechanical device from a plurality of electromechanical devices disposed within the physical environment comprises performing an elevation analysis. In some embodiments, deriving a score for each electromechanical device from a plurality of electromechanical devices disposed within the physical environment comprises performing a dedicated device analysis. In some embodiments, deriving a score for each electromechanical device from a plurality of electromechanical devices disposed within the physical environment comprises performing a device location analysis.

Figure 5:
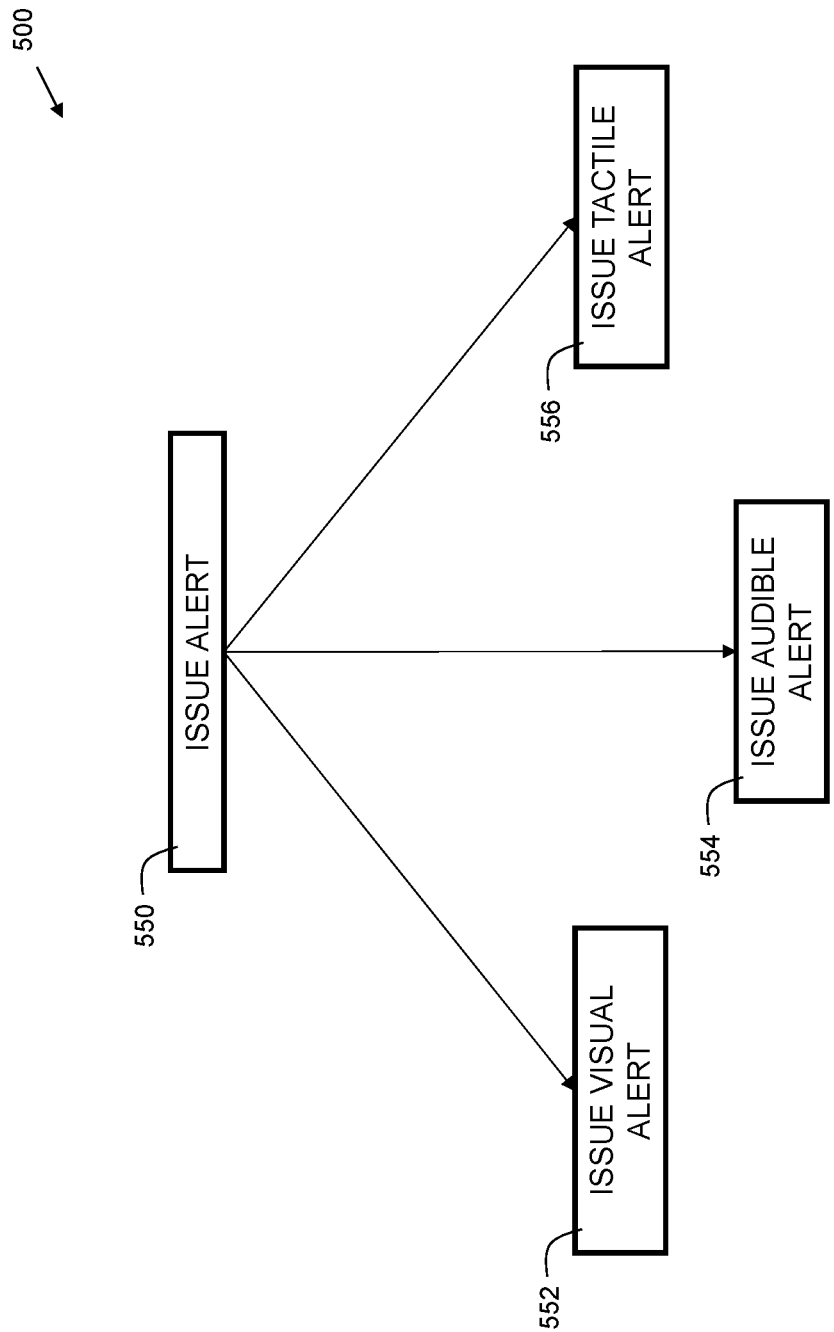
FIG. 5 is a flowchart for additional embodiments of the present invention for providing alerts.

FIG. 5 is a flowchart 500 for additional embodiments of the present invention for providing alerts. At 550 an alert is issued. The alert can include a visual, audible, and/or tactile alert. The alerts may be used to indicate tasks that cannot be performed, or are deferred to a later time. At 552, a visual alert is issued. The visual alert can include a message on a virtual display rendered by a virtual reality headset. At 554, an audible alert is issued. The audible alert may include a tone, chime, or other sound effect. The audible alert may include an utterance from a text-to-speech process. At 556, a tactile alert is issued. The tactile alert may be generated from a vibrator, actuator, solenoid, or other suitable tactile feedback device. Some embodiments may utilize multiple alert types in combination. As an example, some embodiments may render a visual message, and simultaneously sound an audible alert and also generate a tactile alert. Thus, in some embodiments, providing an alert comprises providing a visual alert. In some embodiments, providing an alert comprises providing an audible alert. In some embodiments, providing an alert comprises providing a tactile alert.

Figure 6:
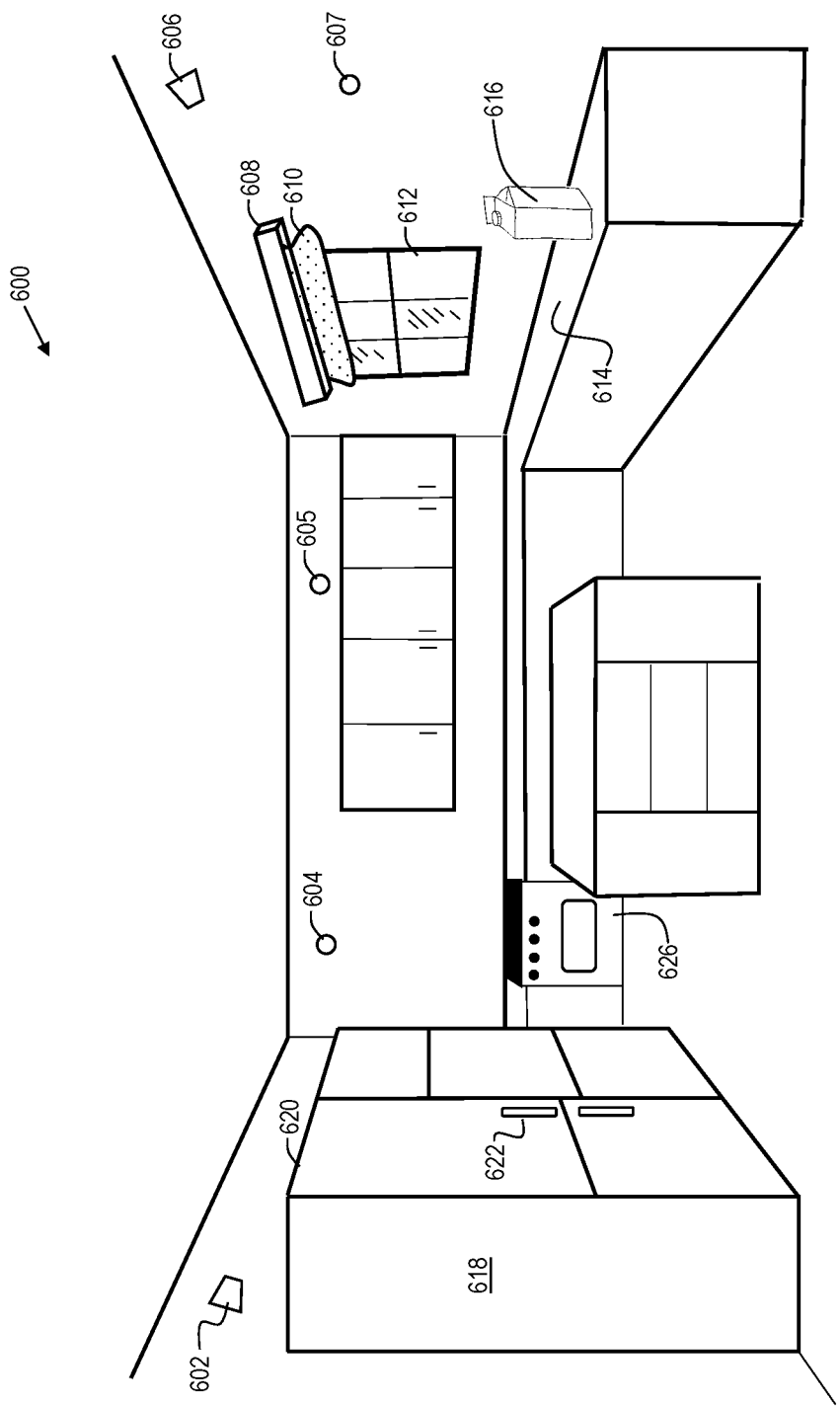
FIG. 6 shows an exemplary physical environment.

FIG. 6 shows an exemplary physical environment 600. Physical environment 600 may include multiple video cameras configured and disposed to record the scene and activity within the physical environment 600. As shown in FIG. 6, a first camera 602 and a second camera 606 are disposed to capture scenes from the physical environment. In the example of FIG. 6, the physical environment is a kitchen. The physical environment 600 includes a refrigerator 618 having a door 620 and a handle 622, an oven 626, and a counter 614. Physical environment 600 also includes a window 612. A window shade 610 is disposed within a housing 608 affixed to an interior wall above the window 612.

The physical environment 600 may include multiple transceivers for an indoor positioning system (IPS). An indoor positioning system (IPS) allows an electronic device to determine its position within the premises. In embodiments, multiple wireless transceivers 604, 605, and 607 are positioned within physical environment 600. The wireless transceivers may include RF beacons, Wi-Fi transmitters, Bluetooth® transmitters, or other suitable devices. The wireless transceivers may be used for triangulation to determine a relative position within physical environment 600.

Figure 7A:
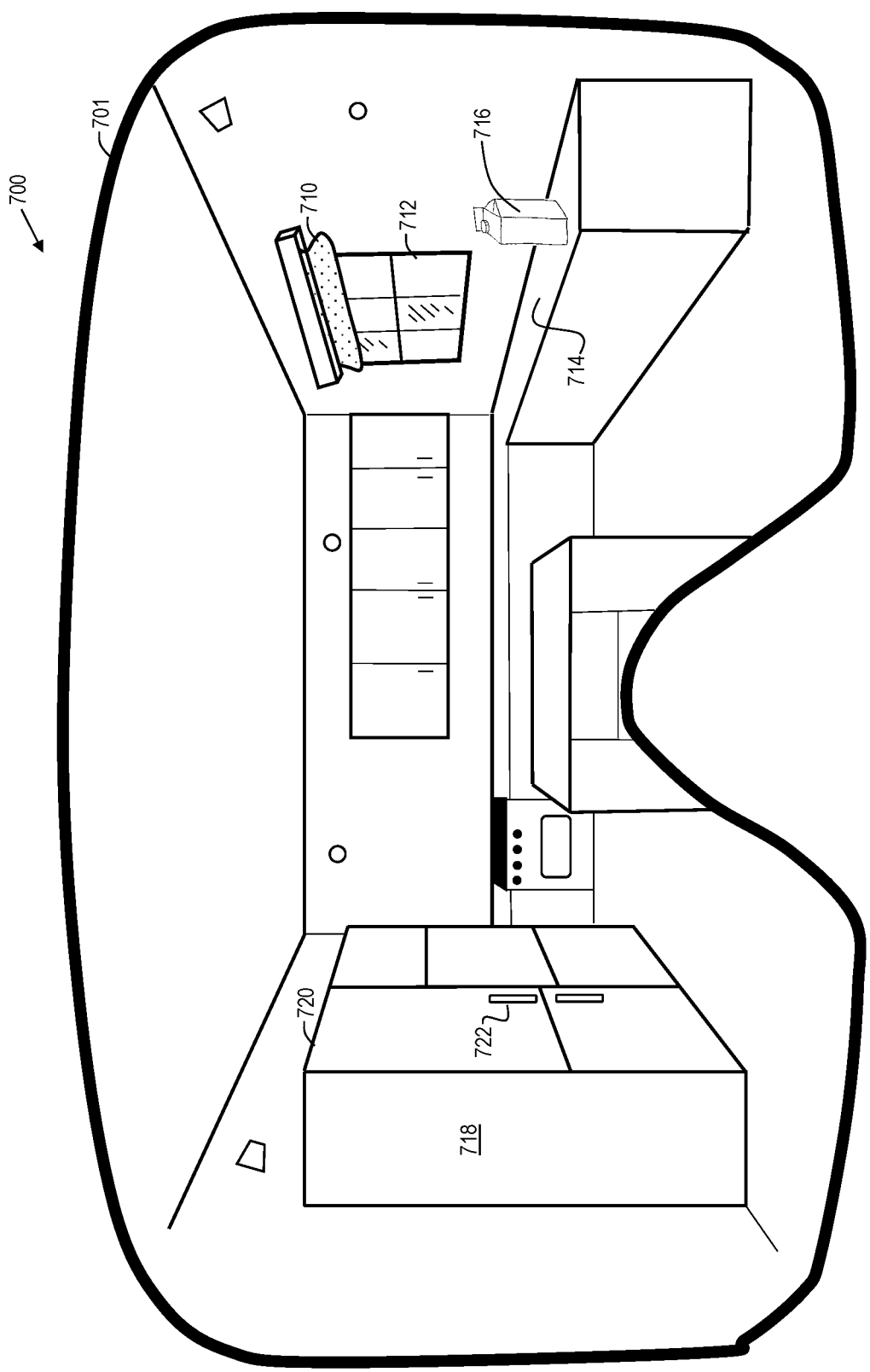
FIG. 7A shows a virtual environment corresponding to the physical environment of FIG. 6.

In the example shown in FIG. 6, a beverage container 616 is disposed on the counter 614. As an example use case, physical environment 600 may represent a kitchen area within the home of a user. The user may be at her office and decides to check on the state of the kitchen after her teenage child left for school. The user dons a virtual reality headset 701 and enters a virtual environment 700 as shown in FIG. 7A, which corresponds to the physical environment of FIG. 6. The user, seeing that her teenage child left for school and left the beverage container 716 on the counter 714, wishes to execute a task in the physical environment of placing the beverage container 716 in the refrigerator 718. Additionally, the user wishes to lower the window shade 710.

Figure 7B:
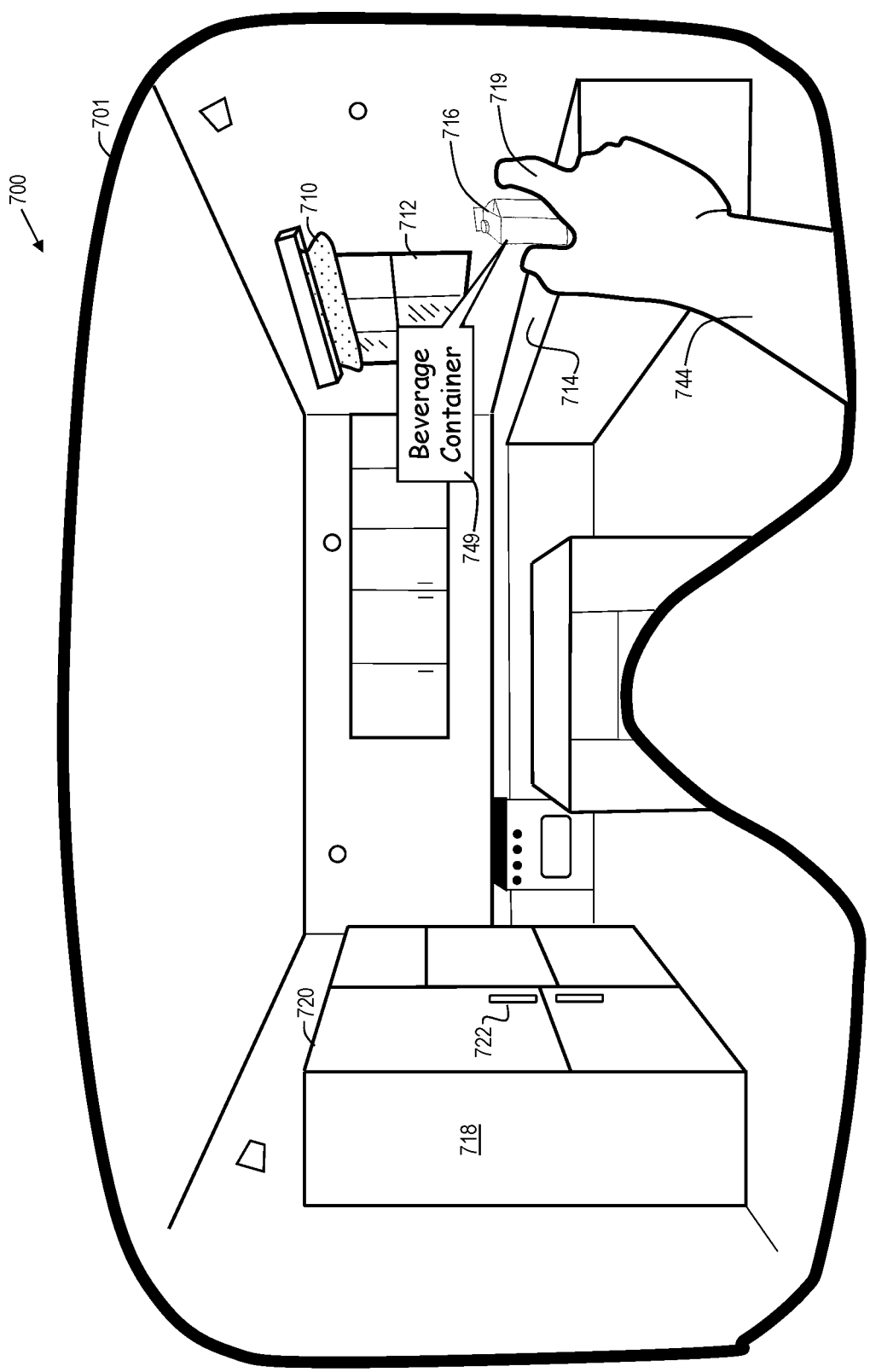
FIG. 7B and FIG. 7C show virtual actions occurring in the virtual environment of FIG. 7A.
Figure 7C:
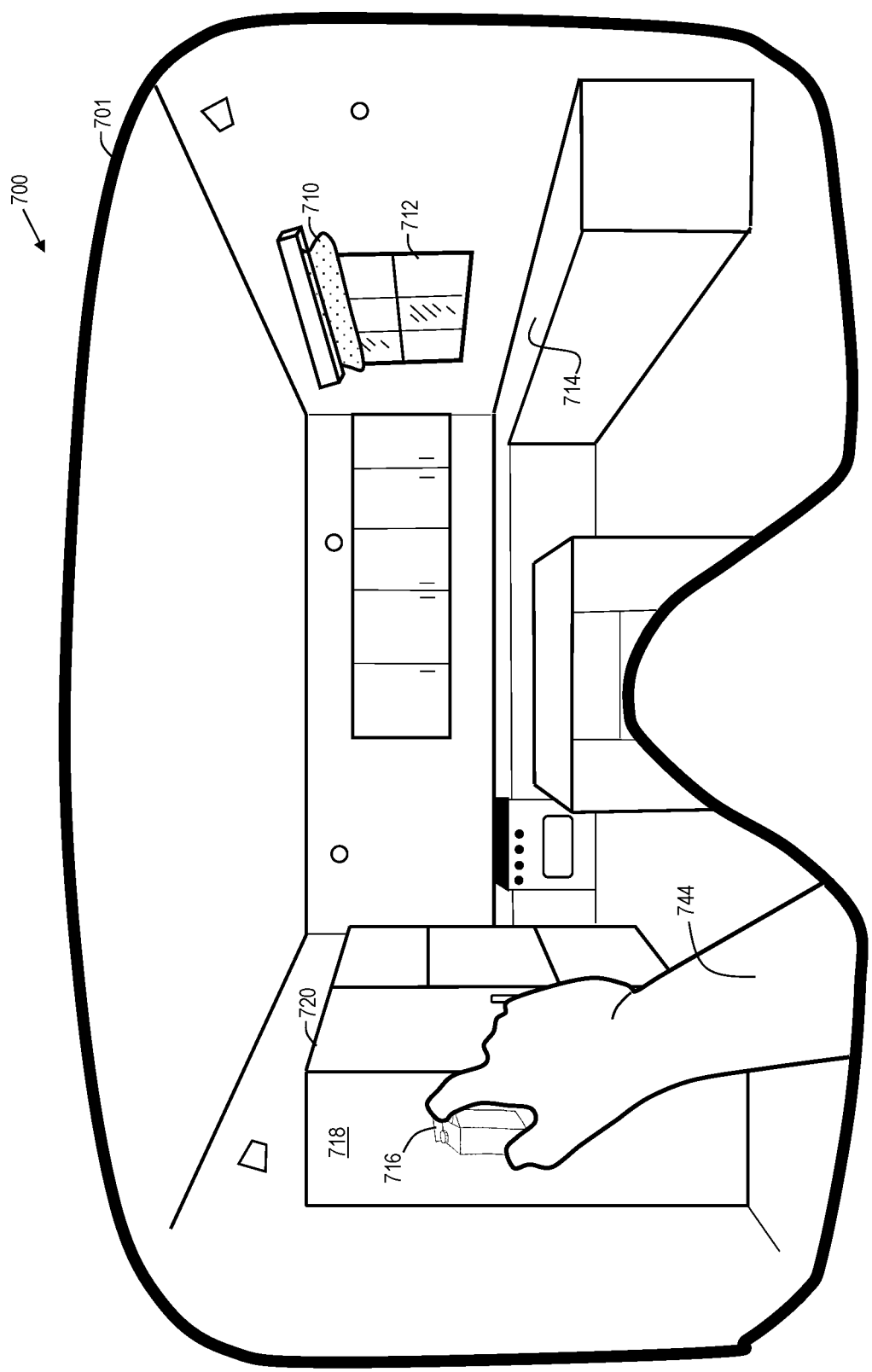

FIG. 7B shows a virtual action occurring in the virtual environment 700 of FIG. 7A. The user places a virtual appendage 744 such that it is gripping virtual beverage container 716. In some embodiments, based on object recognition from image classifiers from machine learning system 122, an object within the virtual environment 700 may be identified. In some embodiments, an annotation message 749 may be rendered at or near the object to assist the user in identifying the object. The user may operate hand 719 of appendage 744 to initiate a gripping action. The user may also use another virtual appendage to open the door 720 of the refrigerator 718 by pulling on handle 722. The user may then move the virtual beverage container to inside the refrigerator 718. In some embodiments, the user may perform an action of moving the virtual beverage container 716 to the refrigerator 718 without opening the door of the virtual refrigerator. The virtual reality control management system 102 may be programmed such that when objects are placed on or near a storage appliance such as a refrigerator, that it is inferred that the object is to be placed/stored in the storage appliance. In this way, the user can simply move the virtual beverage container 716 to in front of the refrigerator 718 as shown in FIG. 7C by moving the virtual appendage 744 to hold the beverage container 716 in front of the refrigerator 718 for a predetermined amount of time (e.g., five seconds). Additionally, the user may perform a pull-down motion on window shade 710 to indicate a task of lowering window shade 710 as to cover window 712. While two tasks are described in this example, in practice, more or fewer tasks may be executed based on virtual actions.

Figure 8:
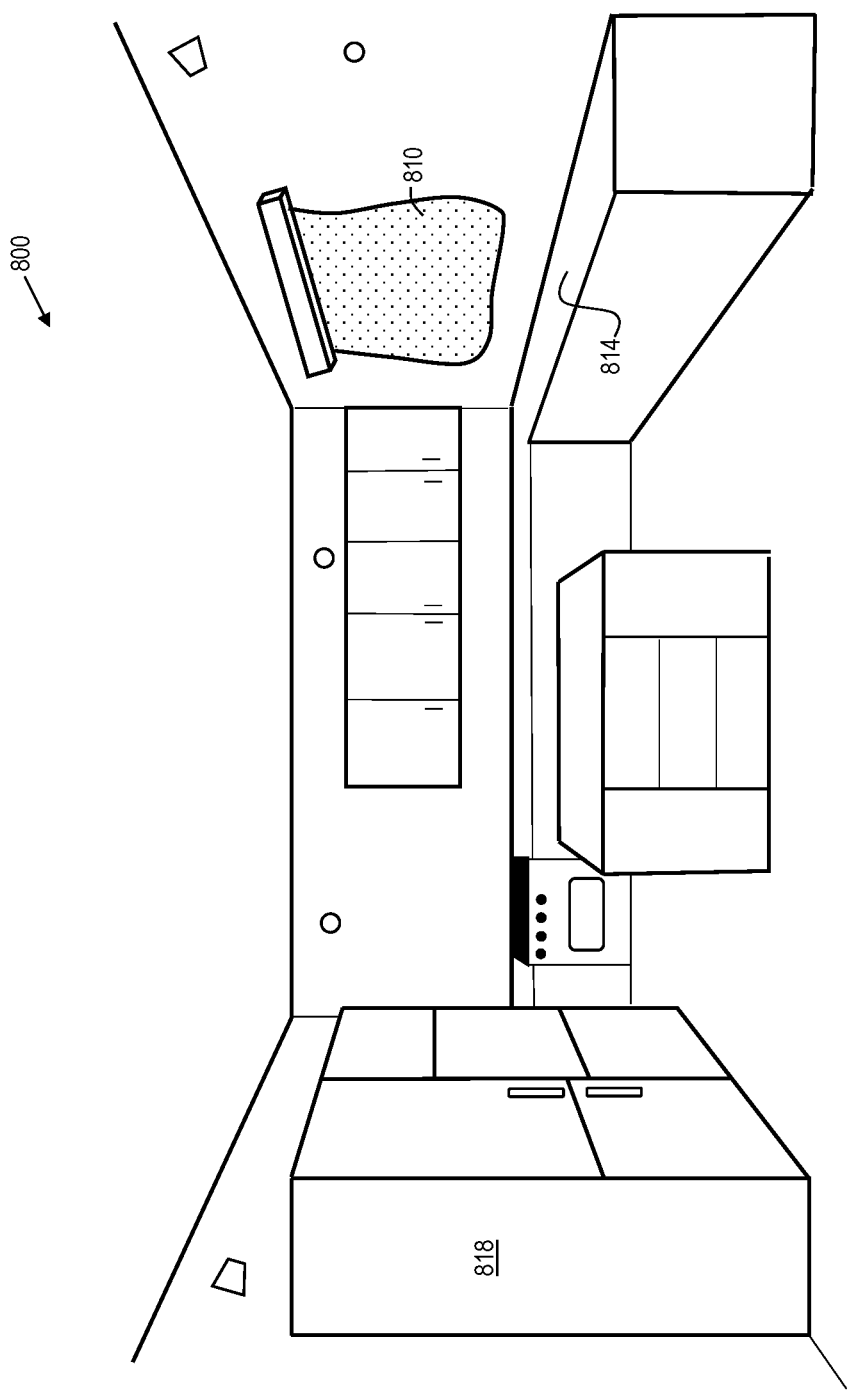
FIG. 8 shows the physical environment of FIG. 6 after physical actions are performed in accordance with embodiments of the present invention.

FIG. 8 shows the physical environment 800 of FIG. 6 after physical actions performed in accordance with disclosed embodiments. Comparing with physical environment 600 of FIG. 6, it can be seen that the beverage container 616 is now removed from the counter 814, and is placed in the refrigerator 818. Additionally, the window shade 810 is now in a lowered position as a result of virtual actions performed by a user in a virtual environment. Thus, the user is able to put away the beverage container and lower the window shade that her child forgot to take care of before leaving for school. In this way, disclosed embodiments allow a user to surveil and take corrective actions in her home, even if she is miles away. Thus, disclosed embodiments improve the technical field of remote monitoring and control of a premises.

Figure 9:
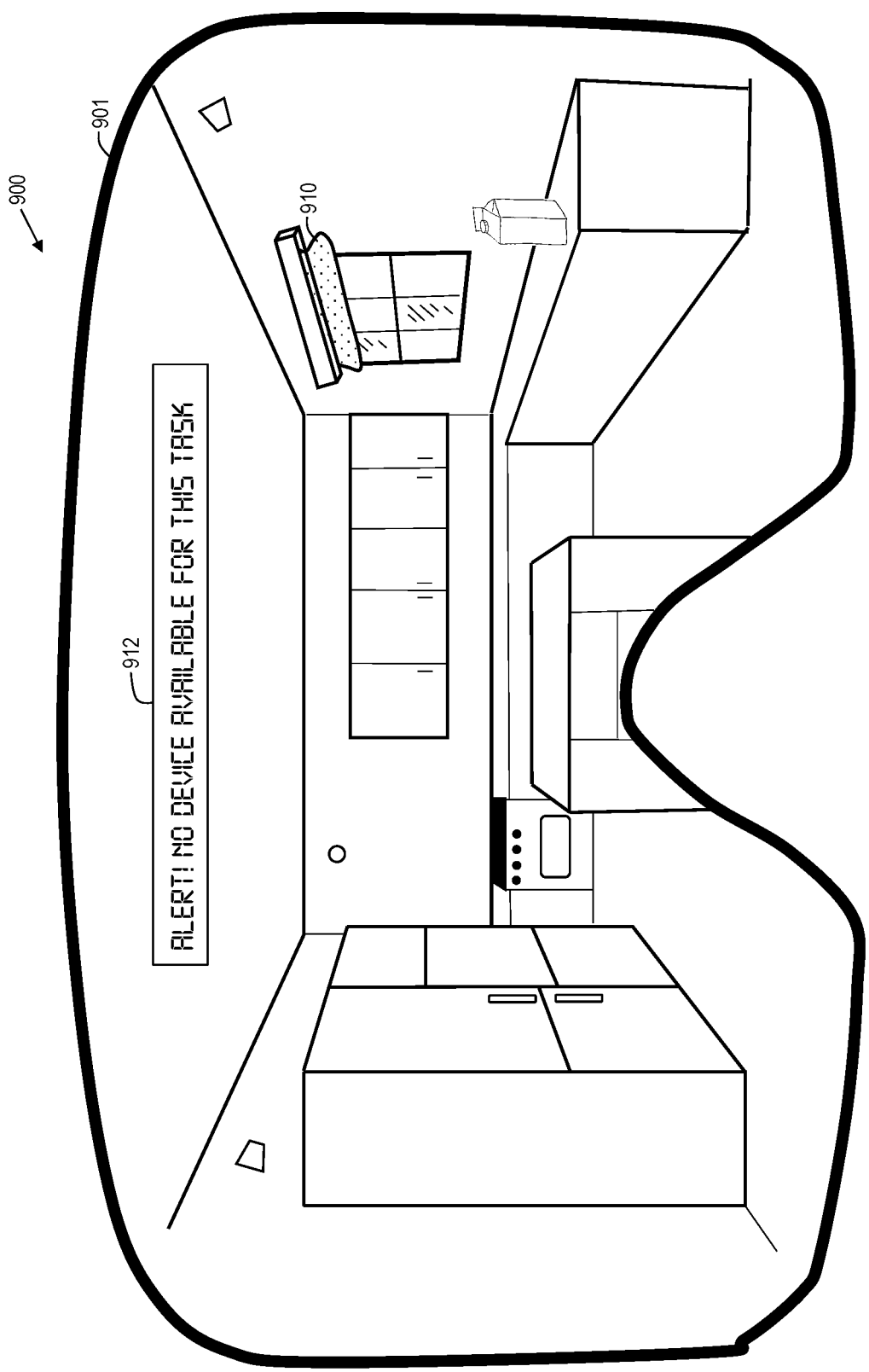
FIG. 9 shows an exemplary alert in accordance with embodiments of the present invention.

FIG. 9 shows an exemplary alert 912 in accordance with disclosed embodiments. In embodiments, the alert 912 is a visual alert rendered in virtual environment 900 via virtual reality headset 901. When a user enters virtual environment 600 and attempts to perform an action such as lowering the window shade 910, if no electromechanical device is available that can reach the window shade 910 to pull it down, then a message such as that shown in 912 may be rendered, indicating that no available device can perform the task.

Figure 10:
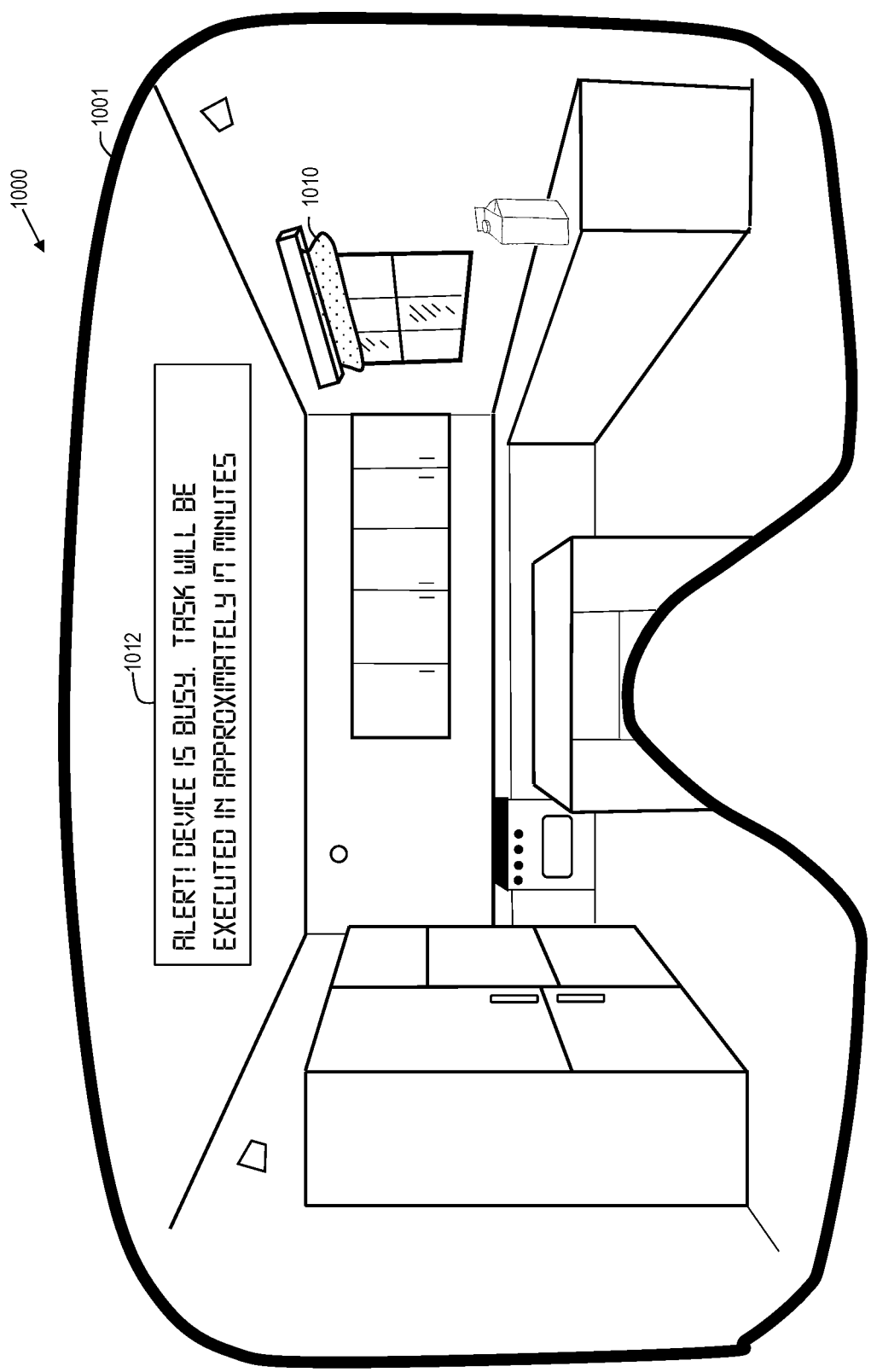
FIG. 10 shows another exemplary alert in accordance with embodiments of the present invention.

FIG. 10 shows another exemplary alert 1012 for deferred task execution in accordance with disclosed embodiments. In embodiments, the alert 1012 is a visual alert rendered via virtual reality headset 1001. When a user enters virtual environment 1000 and attempts to perform an action such as lowering the window shade 1010, if no electromechanical device is currently available that can reach the window shade 1010 to pull it down, but a capable device is expected to be available at a later time, then a message such as that shown in 1012 may be rendered, indicating that a device will become available later to perform the task. For example, a robot may be in the process of recharging, and communicate to the home device management system 127 an estimated time for a complete charge. This information may be used in the alert message to render an estimated task completion time or time when the task will be executed. As shown in alert 1012, there is included an estimated task completion time of 17 minutes.

Figure 11:
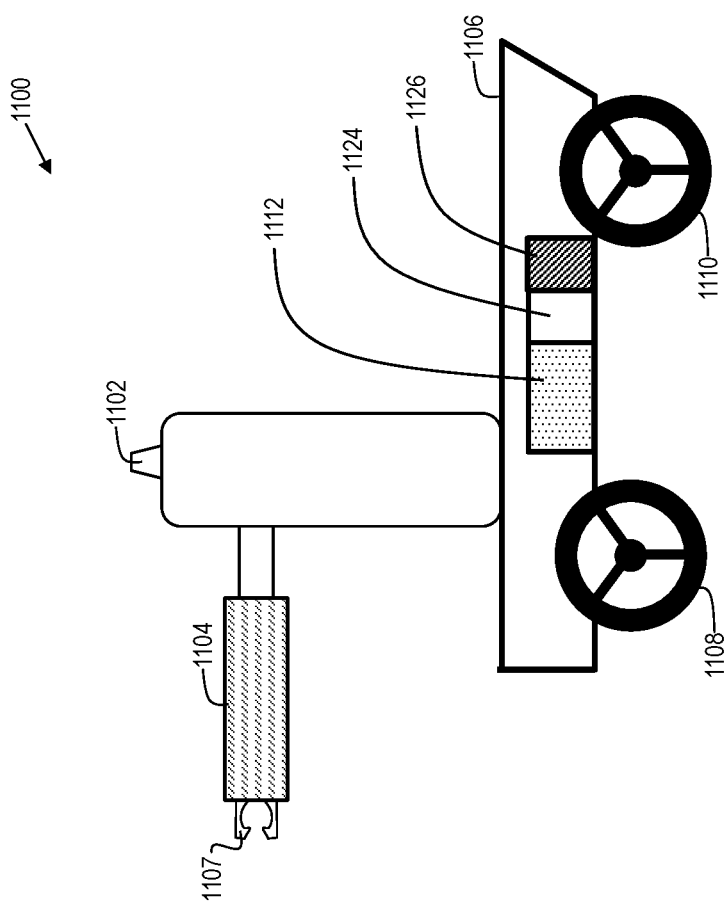
FIG. 11 shows an exemplary electromechanical device utilized in embodiments of the present invention.

FIG. 11 shows an exemplary electromechanical device 1100 utilized in disclosed embodiments. The electromechanical device 1100 is a general-purpose robot. The electromechanical device 1100 includes a chassis 1106. A front wheel assembly 1108 and a rear wheel assembly 1110 are affixed to the chassis 1106. Housed within chassis 1106 is a motor 1112, battery 1124, and control system 1126. The control system 1126 may include one or more processors, memory, and/or communication interfaces for operation of the electromechanical device 1100. The electromechanical device 1100 further includes a camera 1102, and an articulating arm 1104 with a gripper 1107 that can be used to manipulate an object in the execution of a task in a physical environment. The electromechanical device 1100 may be dispatched by the virtual reality control management system 102 to operate on an object, such as, for example a beverage container on a counter as shown in FIGS. 6-10. In embodiments, the virtual reality control management system 102 may provide metadata about the task to the electromechanical device 1100. In embodiments, the metadata can include, but is not limited to, a location of the object to be manipulated, a reference image of the object to be manipulated so that the electromechanical device 1100 can identify the object, a manipulation instruction, such as grip, push, pull, etc., and/or other pertinent metadata. While the electromechanical device 1100 of FIG. 11 shows a general-purpose, wheeled robot with a single articulating arm 1104, other embodiments may include electromechanical devices having multiple articulating arms. Additionally, other motive mechanisms besides wheels may be used, such as caterpillar treads, articulating legs, spherical casters, and/or other suitable motive mechanisms. In embodiments, multiple electromechanical devices may be used within a premises. In embodiments using multiple electromechanical devices, additional parameters may be used in the scoring algorithm, including, but not limited to, shortest possible time for task execution, minimal utilization of computing/network/energy resources, minimum disturbance of the surrounding objects, and/or other suitable parameters.

FIG. 12 shows a database 1200 indicating exemplary data structures in accordance with disclosed embodiments. Data record 1210 illustrates general-purpose device data. Field 1212 is a device identifier. In embodiments, this may be a unique alphanumeric identifier. In some embodiments, the device identifier may include a device serial number, MAC address, or other suitable identifier unique to a particular electromechanical device. Field 1214 is a device description. Field 1216 is a Boolean field indicating if a device is a dedicated device. If this field is set false (N), then the device is deemed to be a general-purpose device. Field 1218 is a manipulation bitmap.

The manipulation bitmap may comprise multiple bitfields, where each bitfield corresponds to a particular manipulation type. In embodiments, a value of '1' is set if the device is capable of performing that manipulation type. Otherwise, a value of '0' is set for that manipulation type. In embodiments, the manipulation types represented in the bitfield can include, but are not limited to, gripping, squeezing, pushing, pulling, sliding, lifting, rotating, inverting, tipping, and/or shaking. These manipulation types represent actions that may be performed on an object by an electromechanical device as part of task execution in a physical environment. Field 1220 specifies an object weight limit, pertaining to the maximum weight that the electromechanical device can lift. If it is known that an object (e.g., a package) weighs more than the value specified in the object weight limit of field 1220, then the electromechanical device may be deemed ineligible to perform the task. Field 1222 is an elevation bitmap. The elevation bitmap may comprise multiple bitfields, where each bitfield corresponds to a particular elevation range. In embodiments, a value of '1' is set if the device is capable of performing object manipulation in that range. Otherwise, a value of '0' is set for that elevation range. In embodiments, the elevation ranges represented in the bitfield can include a predetermined range as specified from floor level. As an example, a first position in the bitfield can represent 0.0 meters to 0.1 meters above floor level, a second position in the bitfield can represent 0.1 to 0.2 meters above floor level, and so on. As an example, a robot limited to floor access (e.g., a floor cleaning robot) may only have the first position set to "1." In contrast, a general-purpose robot that can reach from the floor to the ceiling may have multiple bitfield positions set to "1." Field 1224 is a region list. The region list may specify by a code or number, one or more regions in which the electromechanical device can operate. In embodiments, different rooms within a premises may be designated with a numeric or alphanumeric code. Field 1226 is a region description to list in human-readable form the regions in which the electromechanical device can operate. As shown in the example of FIG. 12, the record 1210 pertains to a general-purpose robot having an identifier H76B4 that has an object weight limit of 13 kilograms and can operate in the lower level and garage areas of the premises.

Data record 1240 illustrates special-purpose device data. Field 1242 is a device identifier. In embodiments, this may be a unique alphanumeric identifier. In some embodiments, the device identifier may include a device serial number, MAC address, or other suitable identifier unique to a particular electromechanical device. Field 1244 is a device description. Field 1246 is a Boolean field indicating if a device is a dedicated device. If this field is set true (Y) then the device is deemed to be a dedicated device, intended for a specific purpose. In the example of FIG. 12, the dedicated device is a garage door opener, as indicated in field 1244. Field 1248 is a dedicated object identifier. The dedicated object identifier pertains to an object on which the dedicated device can perform a task. In the example of FIG. 12, the dedicated object is the left garage door, as indicated by field 1250, which indicates the dedicated object description, and the dedicated device is a garage door opener.

Field 1252 is a capability bitmap. The capability bitmap may comprise multiple bitfields, where each bitfield corresponds to a particular capability. In embodiments, a value of '1' is set if the device supports the corresponding capability, otherwise, a value of '0' is set for that capability. In embodiments, the bitfields in the capability bitmap can represent capabilities including, but not limited to, raising, lowering, turning on, turning off, opening, closing, locking, unlocking, and/or other suitable capabilities.

Figure 13:
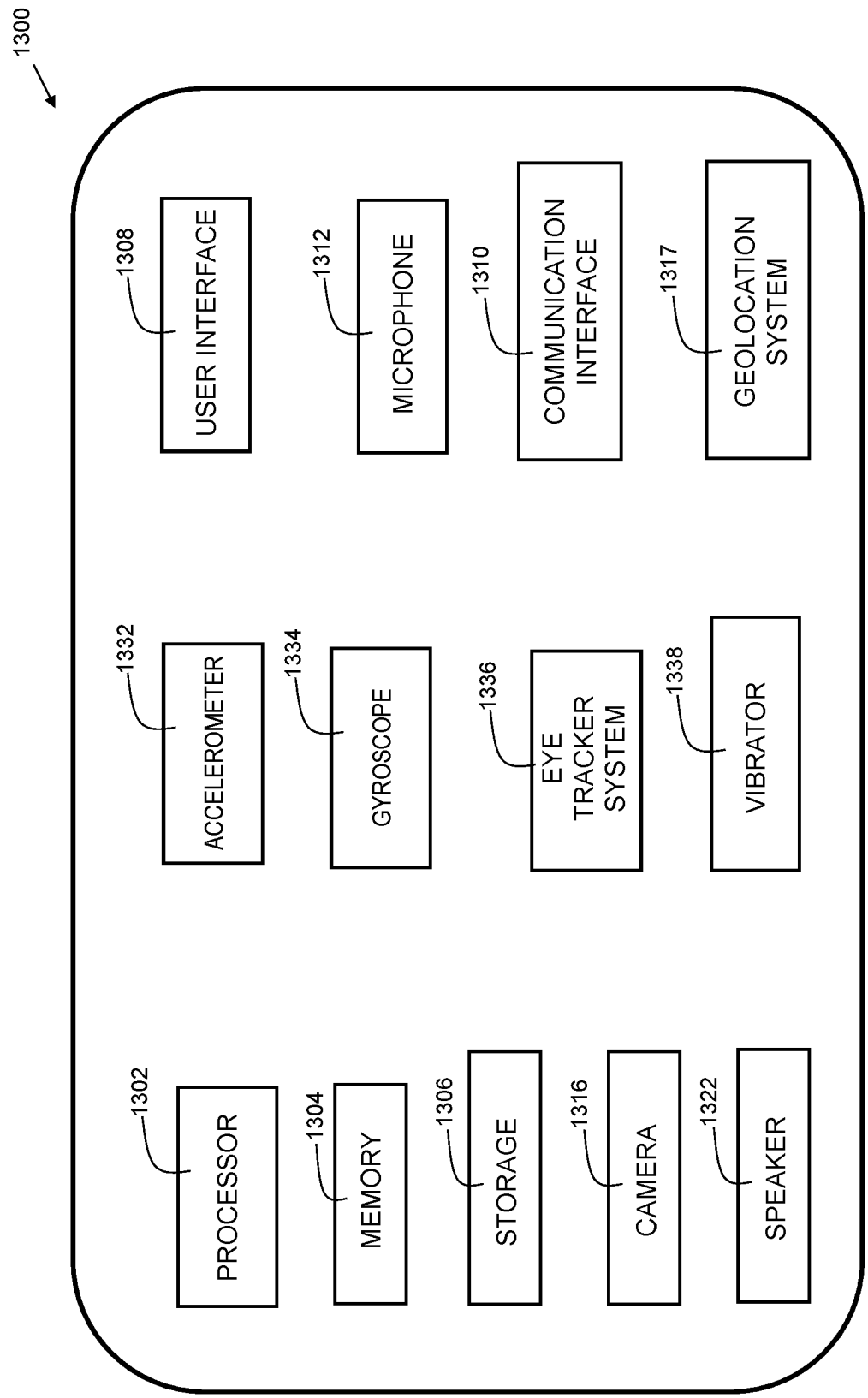
FIG. 13 shows a block diagram of a client device in accordance with embodiments of the present invention.

FIG. 13 shows a block diagram of a client device 1300 in accordance with disclosed embodiments. In embodiments, this may represent a mobile electronic device such as 116 of FIG. 1. Device 1300 includes a processor 1302, which is coupled to a memory 1304. Memory 1304 may include dynamic random-access memory (DRAM), static random-access memory (SRAM), magnetic storage, and/or a read only memory such as flash, EEPROM, optical storage, or other suitable memory. In some embodiments, the memory 1304 may not be a transitory signal per se.

Device 1300 may further include storage 1306. In embodiments, storage 1306 may include one or more magnetic storage devices such as hard disk drives (HDDs). Storage 1306 may additionally include one or more solid state drives (SSDs).

Device 1300 may, in some embodiments, include a user interface 1308. This may include a display, keyboard, or other suitable interface. In some embodiments, the display may be touch-sensitive.

The device 1300 further includes a communication interface 1310. The communication interface 1310 may include a wireless communication interface that includes modulators, demodulators, and antennas for a variety of wireless protocols including, but not limited to, Bluetooth™, Wi-Fi, and/or cellular communication protocols for communication over a computer network and/or operation with an indoor positioning system (IPS). In embodiments, instructions are stored in memory 1304. The instructions, when executed by the processor 1302, cause the electronic computing device 1300 to execute operations in accordance with disclosed embodiments.

Device 1300 may further include a microphone 1312 used to receive audio input. The audio input may include speech utterances. The audio input may be digitized by circuitry within the device 1300. The digitized audio data may be analyzed for phonemes and converted to text for further natural language processing. In some embodiments, the natural language processing may be performed onboard the device 1300. In other embodiments, all or some of the natural language processing may be performed on a remote computer.

Device 1300 may further include camera 1316. In embodiments, camera 1316 may be used to acquire still images and/or video images by device 1300. Device 1300 may further include one or more speakers 1322. In embodiments, speakers 1322 may include stereo headphone speakers, and/or other speakers arranged to provide an immersive sound experience. Device 1300 may further include geolocation system 1317. In embodiments, geolocation system 1317 includes a Global Positioning System (GPS), GLONASS, Galileo, or other suitable satellite navigation system.

Device 1300 may further include an accelerometer 1332 and/or gyroscope 1334. The accelerometer 1332 and/or gyroscope 1334 may be configured and disposed to track movements of a user, such as head and/or hand movements while donning wearable computing devices such as virtual reality headsets and/or hand held remote control devices in communication with a virtual reality system.

Device 1300 may further include an eye tracker system 1336. The eye tracker system 1336 may include one or more cameras configured and disposed to track eye movement of a user, and render portions of a virtual environment based on eye movement. Device 1300 may further include a vibrator 1338 which may be used to provide tactile alerts as depicted at 556 of FIG. 5. These components are exemplary, and other devices may include more, fewer, and/or different components than those depicted in FIG. 13.

As can now be appreciated, disclosed embodiments provide techniques for virtual reality enabled activity allocation. Disclosed embodiments enable a new level of remote monitoring and control by allowing a user to enter a virtual world that is representative of a physical world that may be located remotely from the user. The user can observe conditions in the virtual world, and perform actions in the virtual world. The actions in the virtual world are associated with tasks that are performed in the physical world by electromechanical devices at a physical premises. The electromechanical devices can be dedicated appliances such as garage door openers, thermostats, electronically controlled window shades, and the like. The electromechanical devices can include special-purpose robots such as a robot vacuum cleaner, or a general-purpose robot with object manipulation capabilities. Disclosed embodiments assign a task to the electromechanical device that is best-suited to the task, enabling a user to surveil and take corrective actions in his home, even if he is miles away. Additionally, disclosed embodiments can have applications in various settings such as a warehouse. In embodiments, a user may enter a "virtual warehouse" using a virtual reality system and "lift" a 200-kilogram box from a high shelf. This action in the virtual environment can cause an autonomous fork lift to be dispatched to the location to retrieve the box. Another use case can include geological exploration and/or mining. In such a scenario, a user may enter a virtual environment representative of a cave currently being drilled for minerals. As the user explores the virtual cave, he can indicate a location for drilling or excavation, and the appropriate robotic tool is dispatched to perform the task in the physical environment of the cave while the human user avoids the dangerous physical environment. There are a wide variety of applications possible with disclosed embodiments. Thus, disclosed embodiments improve the technical field of remote monitoring and control of a premises.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for executing a task in a physical environment based on a virtual action, the method, comprising:
   generating a real-time virtual reality (RTVR) environment based on one or more live camera feeds from the physical environment;
   detecting an occurrence of the virtual action in the RTVR environment;

determining a task in the physical environment that corresponds to the virtual action in the RTVR environment;
identifying a plurality of electromechanical devices in the physical environment, the plurality of electromechanical devices including at least one general purpose robot and at least one dedicated device;
deriving a score for each electromechanical device from the plurality of electromechanical devices disposed within the physical environment based on capability to perform the task;
ranking the plurality of electromechanical devices based on the derived score; and
in response to determining a high score at or above a threshold, assigning the task to the electromechanical device associated with the high score.

2. The computer-implemented method of claim 1, further comprising:
recording a physical action of a user in the physical environment;
associating the physical action with the task; and
wherein detecting an occurrence of the virtual action in the RTVR environment comprises detecting the virtual action corresponding to the physical action, and wherein assigning the task comprises assigning the task associated with the physical action.

3. The computer-implemented method of claim 1, wherein deriving a score for each electromechanical device from a plurality of electromechanical devices disposed within the physical environment comprises performing a manipulation type analysis.

4. The computer-implemented method of claim 1, wherein deriving a score for each electromechanical device from a plurality of electromechanical devices disposed within the physical environment comprises performing an elevation analysis.

5. The computer-implemented method of claim 1, wherein deriving a score for each electromechanical device from a plurality of electromechanical devices disposed within the physical environment comprises performing a dedicated device analysis that ranks a dedicated device that is dedicated to perform the task higher than a general purpose robot a dedicated device analysis that ranks a dedicated device that is dedicated to perform the task higher than a general purpose robot.

6. The computer-implemented method of claim 1, wherein deriving a score for each electromechanical device from a plurality of electromechanical devices disposed within the physical environment comprises performing a device location analysis.

7. The computer-implemented method of claim 1, further comprising:
training a machine learning system to associate a symbolic action performed by a user with an assigned task, wherein the symbolic action is a user performed action that symbolizes the performance of the assigned task but does not virtually perform the assigned task;
detecting the symbolic action in the RTVR environment; and
associating the assigned task with the symbolic action.

8. The computer-implemented method of claim 1, further comprising:
in response to determining a high score below a threshold, providing an alert to a user operating in the RTVR environment.

9. The computer-implemented method of claim 8, wherein providing an alert comprises providing a visual alert.

10. The computer-implemented method of claim 8, wherein providing an alert comprises providing an audible alert.

11. The computer-implemented method of claim 8, wherein providing an alert comprises providing a tactile alert.

12. An electronic computation device comprising:
a processor;
a memory coupled to the processor, the memory containing instructions, that when executed by the processor, cause the electronic computation device to:
generate a real-time virtual reality (RTVR) environment based on one or more live camera feeds from a physical environment;
detect a virtual action occurring in the RTVR environment;
determine a task in the physical environment that corresponds to the virtual action in the RTVR environment;
identify a plurality of electromechanical devices in the physical environment, the plurality of electromechanical devices including at least one general purpose robot and at least one dedicated device;
derive a score for each electromechanical device from a plurality of electromechanical devices disposed within the physical environment based on capability to perform the task;
rank the plurality of electromechanical devices based on the derived score; and
in response to determining a high score at or above a threshold, assign the task to the electromechanical device associated with the high score.

13. The electronic computation device of claim 12 wherein the memory further comprises instructions, that when executed by the processor, cause the electronic computation device to:
record a physical action of a user in the physical environment;
associate the physical action with the task;
detect the virtual action corresponding to the physical action; and
assign the task associated with the physical action to the electromechanical device associated with the high score.

14. The electronic computation device of claim 12 wherein the memory further comprises instructions, that when executed by the processor, cause the electronic computation device to: derive a score for each electromechanical device from a plurality of electromechanical devices disposed within the physical environment by performing a manipulation type analysis, an elevation analysis, and a dedicated device analysis that ranks a dedicated device that is dedicated to perform the task higher than a general purpose robot.

15. The electronic computation device of claim 12 wherein the memory further comprises instructions, that when executed by the processor, cause the electronic computation device to:
train a machine learning system to associate a symbolic action performed by a user with an assigned task, wherein the symbolic action is a user performed action that symbolizes the performance of the assigned task but does not virtually perform the assigned task;
detect the symbolic action in the RTVR environment; and
associate the assigned task with the symbolic action.

16. The electronic computation device of claim 12 wherein the memory further comprises instructions, that when executed by the processor, cause the electronic computation device to:

in response to determining a high score below a threshold, provide an alert to a user operating in the RTVR environment.

17. A computer program product for an electronic computation device comprising a computer readable storage medium having program instructions embodied therewith, the program instructions executable by a processor to cause the electronic computation device to:

generate a real-time virtual reality (RTVR) environment based on one or more live camera feeds from a physical environment;

detect a virtual action occurring in the RTVR environment;

determine a task in the physical environment that corresponds to the virtual action in the RTVR environment;

identify a plurality of electromechanical devices in the physical environment, the plurality of electromechanical devices including at least one general purpose robot and at least one dedicated device;

derive a score for each electromechanical device from a plurality of electromechanical devices disposed within the physical environment based on capability to perform the task;

rank the plurality of electromechanical devices based on the derived score; and in response to determining a high score at or above a threshold, assign the task to the electromechanical device associated with the high score.

18. The computer program product of claim 17, wherein the computer readable storage medium includes program instructions executable by the processor to cause the electronic computation device to:

record a physical action of a user in the physical environment;

associate the physical action with the task; and detect the virtual action corresponding to the physical action, and assign the task associated with the physical action.

19. The computer program product of claim 17, wherein the computer readable storage medium includes program instructions executable by the processor to cause the electronic computation device to:

train a machine learning system to associate a symbolic action performed by a user with an assigned task, wherein the symbolic action is a user performed action that symbolizes the performance of the assigned task but does not virtually perform the assigned task;

detect the symbolic action in the RTVR environment; and associate the assigned task with the symbolic action.

20. The computer program product of claim 17, wherein the computer readable storage medium includes program instructions executable by the processor to cause the electronic computation device to:

in response to determining a high score below a threshold, provide an alert to a user operating in the RTVR environment.

\* \* \* \* \*